United States Patent
Slough et al.

(10) Patent No.: US 11,469,003 B2
(45) Date of Patent: Oct. 11, 2022

(54) ADVANCED FUEL CYCLE AND FUSION REACTORS UTILIZING THE SAME

(71) Applicant: HELION ENERGY, INC., Redmond, WA (US)

(72) Inventors: John Thomas Slough, Bellevue, WA (US); David Edwin Kirtley, Seattle, WA (US); Christopher James Pihl, Mill Creek, WA (US)

(73) Assignee: HELION ENERGY, INC., Redmond, WA (US)

( * ) Notice: Subject to any disclaimer, the term of this patent is extended or adjusted under 35 U.S.C. 154(b) by 668 days.

(21) Appl. No.: 15/116,025

(22) PCT Filed: Feb. 6, 2015

(86) PCT No.: PCT/US2015/014904
§ 371 (c)(1),
(2) Date: Aug. 2, 2016

(87) PCT Pub. No.: WO2015/163970
PCT Pub. Date: Oct. 29, 2015

(65) Prior Publication Data
US 2017/0011811 A1    Jan. 12, 2017

Related U.S. Application Data

(60) Provisional application No. 61/937,030, filed on Feb. 7, 2014.

(51) Int. Cl.
*G21B 1/11*    (2006.01)
(52) U.S. Cl.
CPC .................................. *G21B 1/115* (2013.01)

(58) Field of Classification Search
CPC .. G21B 1/05; G21B 1/11; G21B 1/115; G21B 1/13
See application file for complete search history.

(56) References Cited

U.S. PATENT DOCUMENTS

| | | | |
|---|---|---|---|
| 2,991,238 A * | 7/1961 | Suydam | G21B 1/00 313/161 |
| 3,748,226 A * | 7/1973 | Ribe et al. | G21B 1/00 376/124 |
| 3,957,597 A | 5/1976 | Maroni | |

(Continued)

FOREIGN PATENT DOCUMENTS

| | | | | |
|---|---|---|---|---|
| WO | WO-9013129 A2 * | 11/1990 | | G21B 3/00 |
| WO | 2015163970 A2 | 10/2015 | | |

OTHER PUBLICATIONS

Scharping, N. "Why Nuclear Fusion Is Always 30 Years Away" Discover Magazine, 2016. (Year: 2016).*

(Continued)

*Primary Examiner* — Sharon M Davis
(74) *Attorney, Agent, or Firm* — Dorsey & Whitney LLP

(57) ABSTRACT

Examples of advanced fuel cycles for fusion reactors are described. Examples include fuel cycles for use in field reverse configuration (FRC) plasma reactors. In some examples, reaction gases may be removed from a fusion reactor between pulses (e.g. plasmoid collisions). In some examples, a D-$^3$He reaction is performed, with the $^3$He provided from decay of byproducts of previous reactions (e.g. tritium).

13 Claims, 5 Drawing Sheets

(56) References Cited

U.S. PATENT DOCUMENTS

| | | | | |
|---|---|---|---|---|
| 4,228,380 A | * | 10/1980 | Wells | G21B 1/00 |
| | | | | 315/111.41 |
| 2008/0237499 A1 | * | 10/2008 | Auchterlonie | H02J 4/00 |
| | | | | 250/503.1 |
| 2011/0293056 A1 | | 12/2011 | Slough | |

OTHER PUBLICATIONS

Seife, C. Sun in a Bottle. New York: Penguin Group, Inc., 2008, Chapter 10, pp. 220-227. (Year: 2008).*

Cartlidge, E. Fusion Energy Pushed back beyond 2050, BBC News, 2017. (Year: 2017).*

Francis., M. "Fusion reactor achieves tenfold increase in plasma confinement time" Ars Technica 2013. (Year: 2013).*

Lawson, J. D. "Some Criteria fora Power Producing Thermonuclear Reaction" Proc. Phys. Soc., B70, 1957, pp. 6-10. (Year: 1957).*

Stott, P.E. "The feasibility of using D-3He and D-D fusion fuels" 2005 Plasma Phys. Control. Fusion, 47, pp. 1305-1338. (Year: 2005 ).*

First Office Action for CA Application No. 2,938,830, dated May 18, 2017.

Second Office Action for CA Application No. 2,938,830, dated Apr. 23, 2018.

Extended European Search Report received for EP Application No. 15783864.0 dated Sep. 8, 2017.

Mauel, et al., "Fusion Technologies for Tritium-Suppressed D-D Fusion", White Paper prepared for FESAC Materials Science Subcommittee, Dec. 19, 2011, p. 1-11, http://fire.pppl.gov/FESAC WP TsuppDD Mauel.pdf.

Sawan, et al., "Impact of Tritium Removal and HE-3 Recycling on Structure Damage Parameters in a D-D Fusion System", Fusion Engineering and Des, Elsevier Science Publishers, vol. 61-62 Nov. 2002, p. 561-567.

International Search and Written Opinion received for International Application No. PCT/US2015/14904 dated Dec. 11, 2015.

Kesner, et al., "Helium Catalyzed D-D Fusion in a Levitated Dipole", Plasma Science and Fusion Center, Massachusetts Institute of Technology, Cambridge, MA 02139 USA, Dec. 2003, entire document especially, p. 3, 5, 6, 14.

Extended European Search Report for EP Application No. 21163727.7, dated Jul. 12, 2021.

Mauel, et al., "Fusion Technologies for Tritium-Suppressed D-D Fusion", White Paper prepared for FESAC Materials Science Subcommittee, Dec. 19, 2011, retrieved from the Internet: http://fire.pppl.gov/FESAC_WP_TsuppDD_Mauel.pdf, pp. 1-11.

* cited by examiner

ADVANCED FUEL CYCLE AND FUSION REACTORS UTILIZING THE SAME

CROSS-REFERENCE TO RELATED APPLICATION

This application is a 371 National Stage Application of pending International Application No. PCT/US15/14904, filed Feb. 6, 2015, which application claims priority U.S. Provisional Application No. 61/937,030, filed Feb. 7, 2014. These applications are incorporated herein by reference, in their entirety, for any purpose.

TECHNICAL FIELD

Embodiments of the invention relate generally to fusion, and examples of a Helium-3 fuel cycle for a fusion reactor are described.

BACKGROUND

For many years the notion of thermonuclear fusion for electrical energy production was based on deuterium and tritium fuels where most of the fusion energy is released as 14.1 MeV neutrons. The engineering requirements due to wall loading in a commercial fusion reactor are accordingly difficult to achieve. Advanced fuels have been studied so as to mitigate these engineering problems and possibly find a reasonable reactor system with higher plant efficiency.

The P-$^{11}$B fuel cycle seems attractive because no neutrons are generated with this fuel cycle, however it must be said that there are side reactions with the fusion products ($^{11}$B+$^{4}$He→$^{14}$N+n+157 keV) that do generate a small but significant neutron component. Nevertheless, the requisite temperature for P-$^{11}$B fusion is as high as 400 keV. Due to the use of boron, which has a much higher atomic number than helium or hydrogen isotopes, the associated Bremsstrahlung radiation losses are large, and ignition cannot be obtained. The D-$^{3}$He fusion reaction produces no neutrons as well (D+$^{3}$He→$^{4}$He (3.6 MeV)+H (14.7 MeV). However the D-D side reaction, while not as frequent, can generate 14.1 MeV neutrons through one of its fusion product reactions (D+T→$^{4}$He+n+14.1 MeV). There is also the D-D reaction itself that produces a lower energy neutron (2.45 MeV) which is below the threshold for activation of most nuclear materials and is thus far less detrimental.

SUMMARY

Examples of methods and fusion reactors are described herein. Example methods and fusion reactors may be used to extract fusion reaction byproducts from a fusion reactor between pulses.

In some examples, deuterium is supplied to a fusion reactor. A D-D fusion reaction is performed to produce energy, $^{3}$He, and tritium byproducts. The fusion reactor is pulsed to remove at least some of the tritium byproducts produced in the D-D reaction prior to a D-T fusion reaction.

$^{3}$He may be created in some examples through decay of the removed tritium.

In some examples, the fusion reactor is repetitively pulsed.

In some examples, the $^{3}$He removed from the fusion reactor is used in subsequent D-D and/or D-$^{3}$He fusion reactions.

In some examples, the $^{3}$He is supplied to the fusion reactor together with additional deuterium.

In some examples, sufficient $^{3}$He is provided to the fusion reactor from previous D-D fusion reactions to allow for a self-sustaining D-$^{3}$He fuel cycle with no external $^{3}$He addition.

In some examples, the tritium byproducts are remotely stored.

In some examples, conducting the D-D fusion reaction includes forming at least two plasmoids and accelerating the at least two plasmoids towards one another.

In some examples, conducting the D-D fusion reaction includes raising a temperature of a plasma to 70 keV or less.

In some examples, a lithium blanket is provided for production of additional $^{3}$He. In some examples, the method includes storing energy generated during the D-D fusion reaction.

In some example methods, deuterium is received in a fusion reactor. $^{3}$He is also received in the fusion reactor, wherein the $^{3}$He was generated from byproducts and/or decay of byproducts produced previously in the fusion reactor or another fusion reactor. The deuterium is reacted with the $^{3}$He in a fusion reaction, and tritium byproducts of the deuterium and $^{3}$He reaction are removed from the fusion reactor.

Some example methods further include decaying the tritium byproducts to produce further $^{3}$He.

In some example methods, reacting the deuterium with the $^{3}$He comprises accelerating two plasmoids towards one another.

In some example methods, removing tritium byproducts includes pulsing a plasma used in the fusion reaction.

In some example fusion reactors, a plasma formation region is provided for receipt of deuterium and $^{3}$He fuel. The fusion reactor is configured for generated plasmoids to be accelerated and compressed toward one another. Example fusion reactors include an interaction chamber where the plamsoids may merge and a fusion reaction may occur. Example fusion reactors further include one or more divertors for extraction of byproducts of the fusion reaction. The byproducts may include $^{3}$He and/or tritium in some examples.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Example systems and methods described herein may employ a $^3$He fuel cycle which may reduce or suppress a dangerous D-T side reaction by extracting the tritium ions as they are created. The extracted tritium is unstable and may beta decay in a relatively short period of 11 years to $^3$He, a primary fuel for the D-$^3$He reaction. Accordingly, example systems, reactors and methods described herein may enjoy a self-sustaining fuel cycle where the required $^3$He to operate the reactor may be generated by the decay of tritium ions extracted from the reactor itself. In some examples, a D-D side reaction may be suppressed or reduced by operating a fusion plasma at a higher temperature where a fusion cross-section for D-$^3$He is much larger than D-D.

Example reactors described herein and/or which may be used with fuel cycles described herein generally include systems in which plasmoids are formed and accelerated toward one another. Examples of suitable fusion reactors are described, for example, in International Patent Application No. PCT/US2010/024172, filed Feb. 12, 2010, entitled "Method and apparatus for the generation, heating and/or compression of plasmoids and/or recovery of energy therefrom" (claiming priority to U.S. Ser. No. 61/152,221, filed Feb. 12, 2009), U.S. Ser. No. 13/201,428, filed Feb. 12, 2010, entitled "Method and apparatus for the generation, heating and/or compression of plasmoids and/or recovery of energy therefrom," International Patent Application No. PCT/US2011/047119 (WO/2012/021537), filed Aug. 9, 2011, entitled "Apparatus, systems and methods for establishing plasma and using plasma in a rotating magnetic field" (claiming priority to U.S. Ser. No. 61/372,001, filed Aug. 9, 2010), and International Patent Application No. PCT/US2012/063735 (WO/2013/112221), filed Nov. 6, 2012, entitled, "Apparatus, systems and methods for fusion based power generation and engine thrust generation" (claiming priority to U.S. Ser. No. 61/556,657, filed Nov. 7, 2011). All of the afore-mentioned patent applications are incorporated herein by reference in their entirety and for any purpose.

Figure 1:
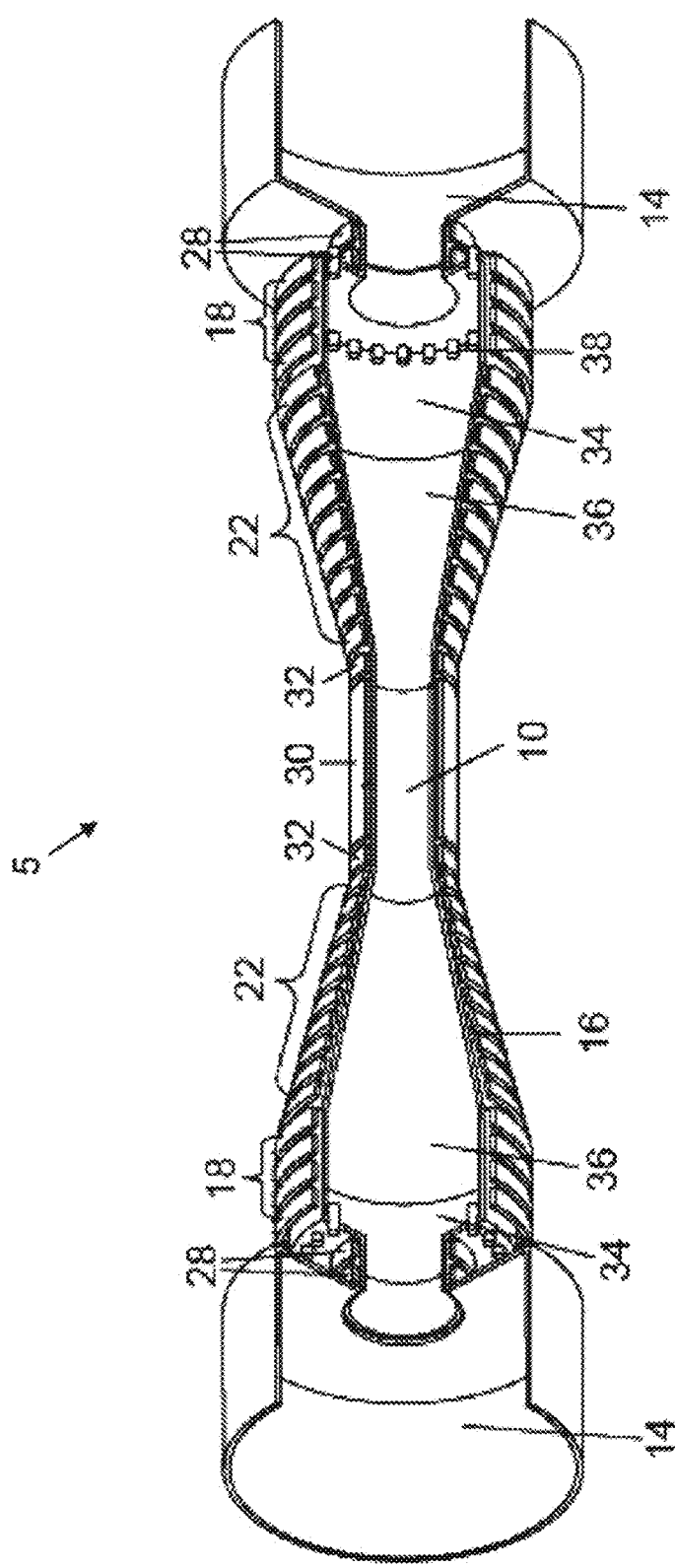
FIG. 1 is a schematic illustration of a portion of a fusion reactor in accordance with examples described herein.

FIG. 1 is a schematic illustration of a portion of a fusion reactor in accordance with examples described herein. The fusion reactor 5 may include an interaction chamber 10 in the center, a formation, accelerator, and compression section 36 on each end of the interaction chamber 10, and a plasmoid formation section 34 next to each accelerator/compression section 36. The fusion reactor 5 may additionally include a divertor 14 on the outer end of each formation section 34. The fusion reactor 5 may also include interaction chamber coils 30, 32 around the outer perimeter of the interaction chamber 10, accelerator coils 22 around the outer perimeter of the acceleration/compression section 36, formation coils 18 around the outer perimeter of formation section 34, and end coils 28 around the outer perimeter of the fusion reactor 5 between the extreme end of each formation section 34 and the respective divertor 14. The fusion reactor 5 may further include an annular array of small plasmoid sources 38 located near a dielectric vacuum tube wall under the first formation/acceleration coil 18 nearest the end coils 28. The chamber wall 16 of the fusion reactor 5 may act as a vacuum boundary.

During operation, the axial array of coils may be energized in a properly sequenced manner to obtain the reactions described herein. Generally, the coil systems may provide for formation, acceleration, and compression of field reversed configuration (FRC) plasmoids to high velocity with respect to one another (e.g. up to 800 km/s). The motional energy of the FRC plasmoids may provide a significant fraction of the energy needed to heat the plasma to fusion temperature. The motional energy may be converted into thermal energy when two FRC plasmoids merge. The formation coils 18 may be supplied with an initial reverse bias. A forward bias is applied to the end coils 28 and the accelerator coils 22, as well as the interaction chamber coils 30, 32. The plasma formation section 34 may be increased in radius to provide for greater initial flux and energy. This is followed at smaller radius by a set of accelerator/compression coils 22 with forward bias increasing as the radius decreases moving toward the interaction chamber 10. A gradual reduction in radius and increase in compression may in some examples result as a plasmoid travels down the acceleration/compression section 36.

The formation coils 18 may be energized sequentially to both form, accelerate, and compress the plasmoids simultaneously. In this manner, plasmoids may be magnetically isolated from the vacuum wall and moved toward and into the interaction chamber where they are merged with their mirror image to form a merged plasmoid that may be compressed to thermonuclear conditions. Accordingly, precise control of the coils may be used to repeatedly drive plasmoids into the interaction chamber from opposite directions, colliding and merging the plasmoids. After one pair has merged, another pair may enter the interaction chamber for merging and thermonuclear reaction. This "pulsing" of collision in the interaction chamber may advantageously allow access to the reaction products (e.g. during a time between collisions in in the interaction chamber), and accordingly allow for removal of tritium formed during a deuterium reaction. The tritium may in some examples be removed between each pulse—e.g. the plasmoids may collide and D-D fusion reactions occur, then tritium byproducts may be removed prior to undesired D-T reactions taking place, then a subsequent plasmoid collision may occur, followed by tritium byproduct removal, etc.

Accordingly, deuterium and He may be introduced in some examples to the formation region of the fusion reactor. Byproducts including $^3$He and tritium may be collected at the divertor region (e.g. divertor 14 of FIG. 1).

The divertor, e.g. divertor 14 of FIG. 1, may serve a variety of purposes. In the divertor region energy and fuel may be extracted from the fusion reaction between pulses. For example, fuel byproducts including hydrogen, deuterium, tritium, Helium-3 (Helion) and Helium-4 (Alpha) particles, or combinations thereof, may be extracted and separated in the divertor region. There are a number of techniques that may be used, and the particular technique in a given example may be selected based on the specific economics of a particular installation. Generally, the extraction techniques take advantage of the fact that the particles all have different mass-to-charge ratios and have a large energy spread. Suitable techniques include but are not limited to cryogenic separation, mass quadrupole separation, inversion-ion cyclotron extraction, and as well as a host of standard chemical processes. Extraction and separation may be done in-situ or at an external location. In this manner, Helium-3 (e.g. $^3$He) and tritium may be extracted from the byproduct of a fusion reaction and stored. The tritium may decay to $^3$He. The harvested $^3$He may be used as fuel for subsequent fusion reactions in the same or a different fusion reactor.

Generally, the repetitively-pulsed nature of example fusion reactors, along with the divertor/converter regions, e.g. 14 of FIG. 1 located remotely from the fusion burn chamber (see e.g. element 10 of FIG. 1), the extraction of tritium can be obtained completely suppressing or reducing this side reaction. The suppression of the D-D reaction can be obtained by raising the plasma temperature to 70 keV which may also assure a self-ignited state which may be appreciably lower than that of other advanced fuel cycles in some examples. By being pulsed, examples of fusion reactors described herein may be capable of removing the tritium byproduct of the D-D reaction with each pulse reducing the high energy neutron (14.1 MeV) generation from the D-T reaction to near zero. This may reduce both the damage and activation the surrounding reactor materials, as well as provide for a source of $^3$He through the beta decay of the recovered triton into a helion. This fuel cycle can therefore be referred to as Helion Catalyzed D-D through self-supplied $^3$He, or HelCat-DD.

Accordingly, following a plasma pulse (e.g. plasmoid collision), byproducts of the reaction including $^3$He and tritium may be removed from the fusion reactor. In some examples, the byproducts may be retained in, e.g. a reservoir, and later processed. Processing of the byproducts may include removal of the $^3$He and storage of the tritium to allow for decay of the tritium to $^3$He. $^3$He removed from the fusion reactor may be used in subsequent fusion reactors in that or a different fusion reactor. Similarly, $^3$He produced through decay of tritium produced in the fusion reactor may be used in subsequent fusion reactions in that or a different fusion reactor. In this manner, a reactor may be operated in some examples using only $^3$He that was produced from previous fusion reactions (either directly or through tritium decay in the same or a different fusion reactor).

Once the initial fuel supply is established in some examples of fusion reactors described herein, the only new fuel which may be required for continued operation may be deuterium which is abundant on earth, and can be readily supplied from water from any source. With primarily all of the fusion energy in the form of fusion particle energy, a high net plant electrical generation efficiency can be obtained from direct conversion of both the fusion product and fusion plasma particles in some examples. This may be accomplished through the electromagnetic compression and expansion cycle employed to create the fusion conditions and thus may avoid the low efficiency and waste heat issues typically found in the usual thermal cycle employed by other nuclear and carbon based power sources.

Figure 2:
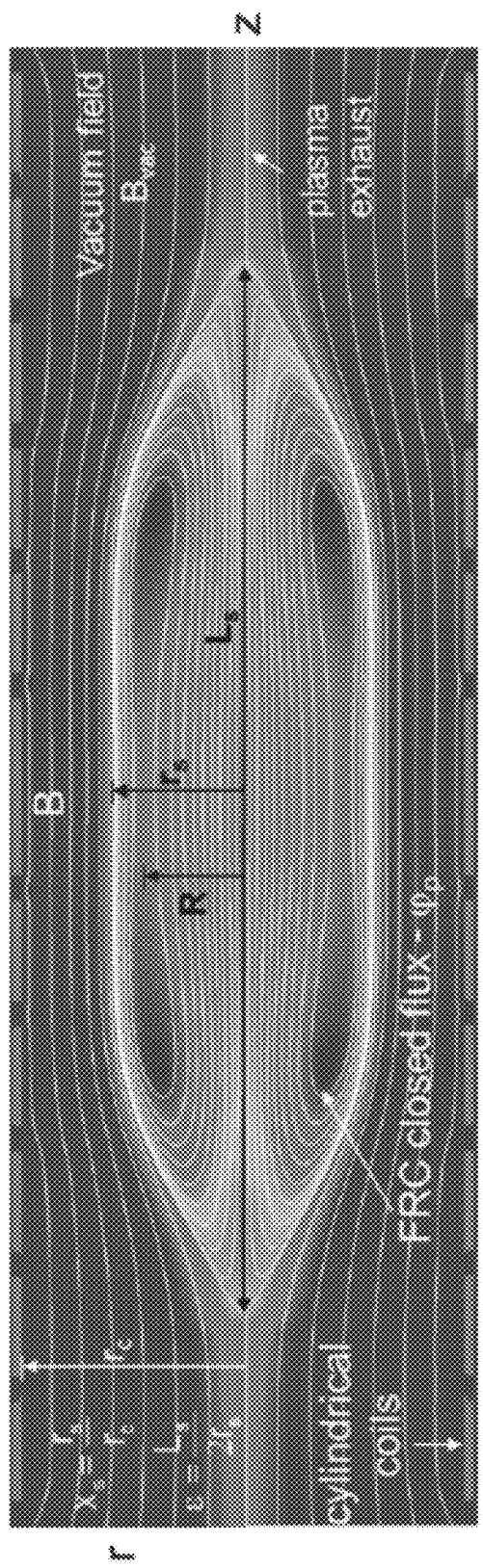
FIG. 2 is an illustration of field lines and pressure contours for an FRC plasmoid obtained from a resistive, two dimensional magneto-hydrodynamic (MED) code calculation.

There may be several advantages of example implementations of the He fuel cycle combined with the Field-Reversed Configuration (FRC) fusion plasma generated in example fusion reactors described herein. Advantages are described herein by way of example and are not intended to be limiting. It is to be understood that not all examples may display all, or even any, of the described advantages. The FRC represents a promising magnetic confinement system for fusion regardless of fuel cycle. FIG. 2 is an illustration of field lines and pressure contours for an FRC plasmoid obtained from a resistive, two dimensional magneto-hydrodynamic (MHD) code calculation. The FRC plasmoid generally has no internal mechanical structure, no appreciable toroidal field or rotational transform, and an engineering beta near unity (where β is the ratio of plasma to confining magnetic field energy density). The equilibrium current is due generally to the plasma diamagnetism thereby avoiding or reducing the current driven instabilities that plague other fusion concepts. Plasma loss at the FRC edge generally occurs across a magnetic separatrix ensuring that the lost plasma is conducted far away from the burn region to a remote chamber where both the plasma and fusion particle energy can be directly converted to electricity at high efficiency. As a result of these features, the FRC offers a transformational change in reactor attractiveness. Example FRC based fusion reactors provide generally for high power density, simple structural and magnetic topology, straightforward heat exhaust handling, capability to burn advanced fuels for direct energy conversion, and radically reduced costs, due at least in part to their small size and low neutron fluence.

A significant issue for magnetically confined plasmas is synchrotron radiation as the magnetic field strength is increased to attain the higher temperatures and pressures required for advanced fuel cycles such as D-$^3$He. Devices such as the tokamak which have a relatively small plasma pressure compared to the large magnetic pressure needed to confine the plasma (β~4%), cannot operate on advanced fuels due to the high energy loss from synchrotron radiation. To be viable, the local value of β, the ratio of plasma to magnetic energy density, must generally be high as this assures that inside the plasma the magnitude of the magnetic field is never large enough to cause significant synchrotron losses. Due to the high β nature of the FRC equilibrium, essentially all of the reacting volume of the FRC is characterized by a magnetic field of very low to negligible field strength, and thus an insignificant amount of synchrotron radiation.

A practical problem faced by the D-$^3$He fuel cycle is the low availability of $^3$He in nature. To avoid this difficulty, the helion ($^3$He) in examples described herein is created either directly or through the decay of tritium produced in the D-D reaction. In this manner the helion ions needed for the operation of the reactor are supplied by the D-D side reactions. This fuel cycle can therefore be referred to as Helion Catalyzed D-D through self-supplied $^3$He, or HelCat-DD. In this manner, once plant operation is established, the only new fuel required for continued operation in some examples is deuterium with all or substantially all the helion atoms coming from those produced directly in the D-D reaction or from the decay of the tritons removed from the reactor after each pulse.

Figure 3:
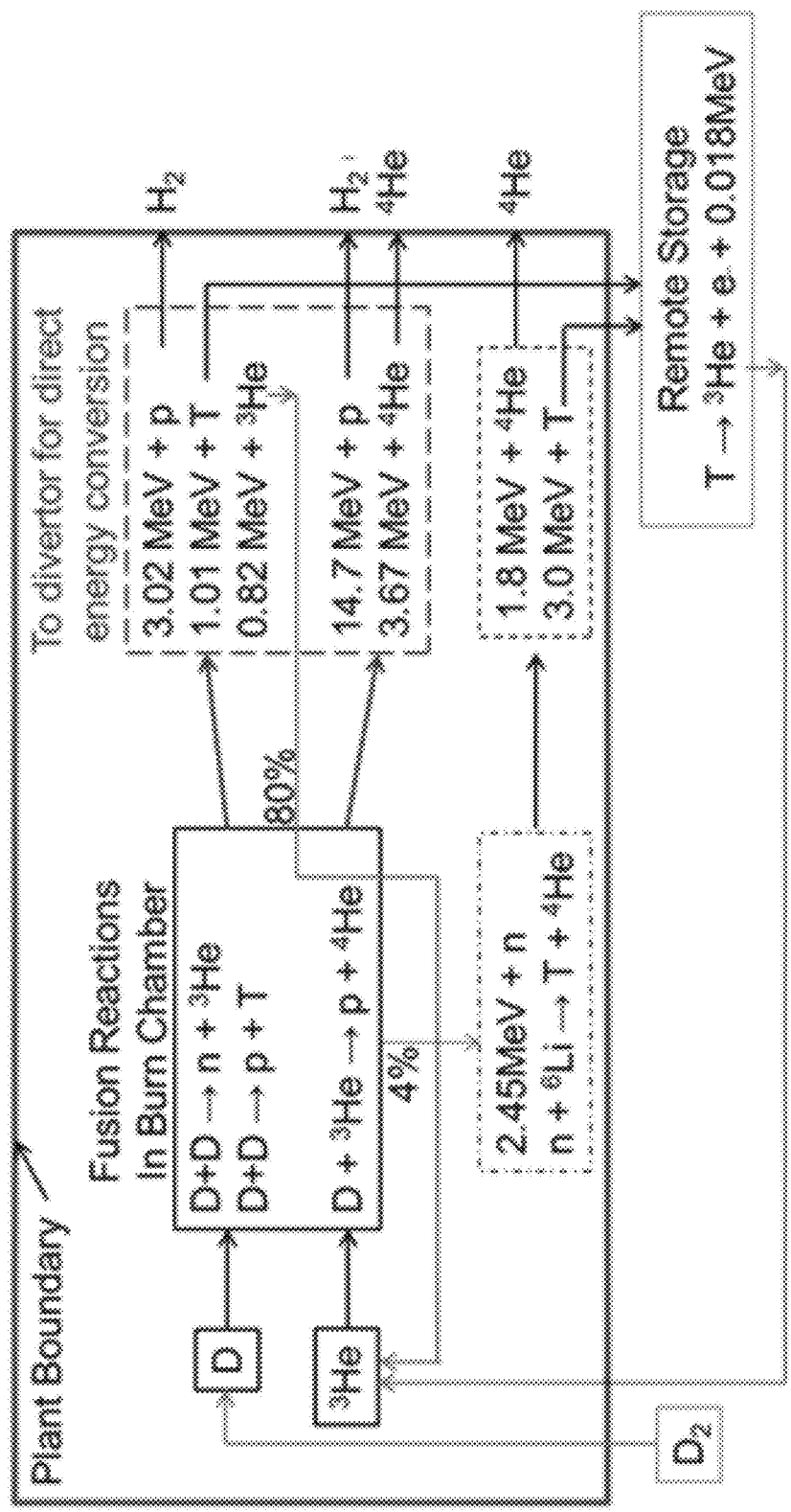
FIG. 3 is a schematic illustration of reactions occurring in example D-$^{3}$He fuel cycles described herein.

FIG. 3 is a schematic illustration of reactions occurring in example D-$^3$He fuel cycles described herein. During operation, Deuterium (D) and $^3$He may be provided to a fusion reactor (e.g. to the reactor 5 of FIG. 1). In the burn chamber (e.g. interaction chamber 10 of FIG. 1), D and $^3$He may react as shown to produce protons and $^4$He. In the divertor (e.g. divertor 14 of FIG. 1), energy conversion may occur yielding 3.02 MeV protons, 1.01 MeV tritons and 0.82 MeV $^3$He. The $^3$He may be removed from the divertor and returned to the fusion reactor for use in reacting with additional incoming Deuterium. The tritons may be removed from the divertor and allowed to decay in a remote storage location. In some examples, the storage location need not be remote. The tritons may decay to $^3$He and 0.018 MeV electrons. The $^3$He may be provided back to the fusion reactor for use in subsequent D-$^3$He reactions. Side D+D reactions in the burn chamber may produce neutrons and $^3$He as well as protons and tritons. In the divertor, these side reactions may yield 14.7 MeV protons and 3.67 MeV $^4$He.

In some examples, a lithium blanket may be provided (e.g. in or around the interaction chamber 10 of FIG. 1). As shown in FIG. 3, the Deuterium reactions may further produce 2.45 MeV neutrons, which may react with lithium $^6$Li to form tritons and $^4$He. At the divertor, this may yield 1.8 MeV $^4$He and 3.0 MeV tritons. The tritons may be transported out of the fusion reactor and may decay to $^3$He which may be used in subsequent reactions by the fusion reactor.

Accordingly, generally Deuterium may be provided to a reactor. Some $^3$He may be provided to initialize the reactor in some examples. In some examples, subsequent $^3$He may be provided by decay of reactor products. Fusion reactions take place by sequentially accelerating and compressing plasmoids until they are merged in an interaction chamber. Following merging of the plasmoids, reaction products including tritons may be removed from the fusion reactor and allowed to decay. The removal may occur after each pulse (e.g. plasmoid merging) of the reactor in some examples.

While the reaction cross section can be as large for D-$^3$He operation as the D-T fuel cycle, it must generally be obtained at increased plasma temperature, T. The plasma pressure Ppl scales linearly with T. As noted, this requires a larger confining magnetic field, B (Ppl~$B^2$). For devices such as the tokamak, which already require operation at near the maximum practical field that can be obtained for superconducting magnets (B~15 T), the magnetic field cannot generally be further increased. The consequence is that the plasma density, n, must be lowered (Ppl~T). The fusion power scales as $n^2$ so that the reactor volume, and with it cost, must increase dramatically to produce the same output power. Example fusion reactors described herein, however, employ the FRC as the fusion plasma. Fusion power density then scales as $\beta'B^4$. The FRC may in some examples have the highest $\beta$ of all magnetic fusion plasmas and may be contained in some examples by simple cylindrical magnets that can be operated at the highest practical fields. Repetitive operation of pulsed fields up to 30 T with conventional copper alloy coils may be performed in some examples. Having a much higher power density in some examples aids in maintaining the output power from fusion when employing the HelCat DD cycle, and only in the pulsed FRC compression cycle found in example fusion reactors can the power be maintained, and even increased with the HelCat DD advanced fuel cycle due to the much reduced neutron wall loading. By being compact, the ratio of reacting volume to receiving surface area may also be minimized or reduced, allowing for operation at the higher power density. By being pulsed, the pulse duration can be extended or the repetition rate increased to maintain the fusion output power at the highest levels consistent with heat removal.

Parameters of the fusion plasma may be selected to ensure or promote a low neutron yield and high efficiency for energy production. The parameters may be based on the steady state value of the relative quantities of each fuel element (D and $^3$He). Variants of the D-$^3$He cycle with $^3$He self-supply are also possible. With primarily all of the fusion energy in the form of fusion particle energy a high net plant thermal efficiency can be obtained from converting much of the fusion power by direct conversion. The low neutron energy yield may also afford a lower cost of first wall and shield structures in some examples. It may also provide for higher plant availability and operating life due to the lower wall loading, afterheat, and radioactive isotope inventory in some examples.

An attribute of example fusion reactors described herein is relatively easy access to the fusion products in the exhaust gas stream after each pulse (e.g. merging of plasmoids). This allows for the selective removal of fusion products. In examples, the charged fusion products, $^3$He and T included, may be moderated in the plasma releasing their energy to it. This allows for direct energy conversion in the burn chamber from plasma expansion and subsequent flux driven energy conversion. The removed T may be stored and the $^3$He that is obtained may be used to supply one of the D-$^3$He fuel components. Examples of this type of operation may have advantages when compared to steady state systems, or systems where there is no easy access to the fusion byproducts.

First, the tritons created generally have no time for interaction with D, which allows one to obtain a larger amount of $^3$He. Second, since the D-T reaction is generally negligible, the neutron flux to the first wall is reduced compared with in situ consumption of the triton. The reduction is in large part due to the elimination of the most dangerous high-energy neutrons created by the D-T reaction ($E_{neut}$=14.1 MeV).

Figure 4:
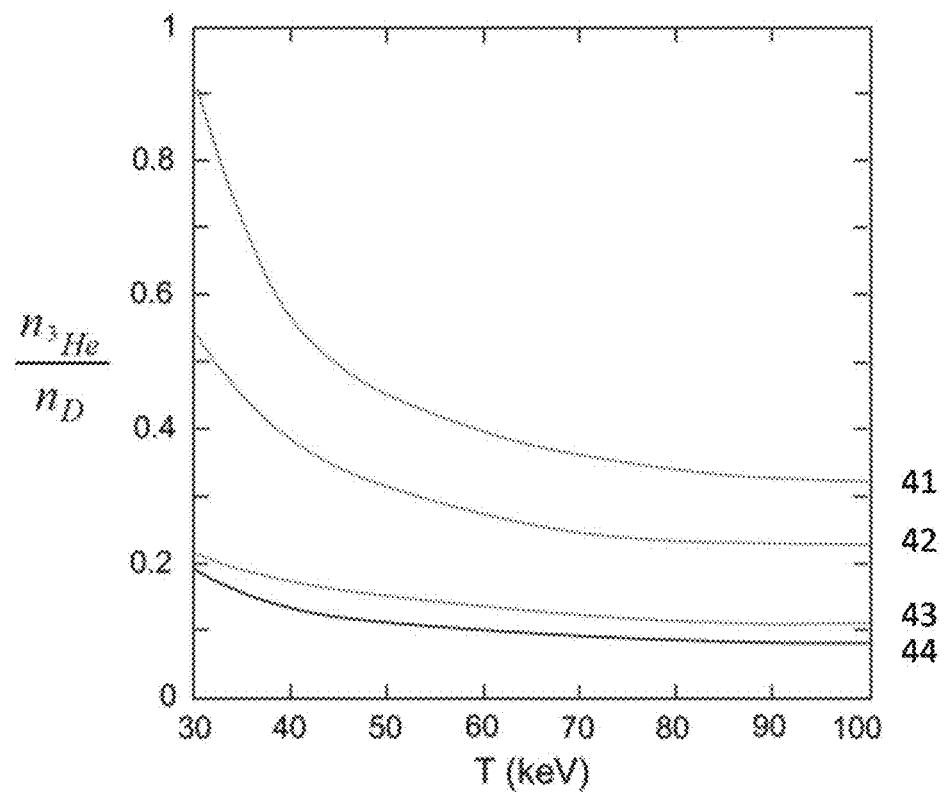
FIG. 4 is a graph of helion to deuteron ratio in example fusion plasmas in various modes of operation.

In some examples, the neutron born in the D-D reaction (see FIG. 3) can be used to create additional helions through tritium production in the presence of lithium in the blanket. In such examples, the $^3$He and T produced in the FRC plasma may also be used. Generally, the two D-D fusion reactions in FIG. 3 serve mainly for the production of $^3$He and T (this also applies to the secondary reactions with the fusion neutrons if desired). This part of the cycle eventually may provide the $^3$He to complete the cycle where the overwhelming fraction of the fusion energy generated is provided by the reaction of D with $^3$He. The effect of the different operating cycles on the steady state fraction of $^3$He is shown in FIG. 4. It is clear from this plot that the helion to deuteron ratio is greatly enhanced at low plasma temperature due to the relative increase in D-D reactions. Neutron conversion into tritium for decay into He is readily accomplished with a natural lithium blanket (7.56% $^6$Li, remainder $^7$Li) where the reaction $^7$Li+n→T+$^4$He+n−2.47 MeV produces a second neutron assuring a total $^3$He yield per D-D neutron greater than one (up to a maximum of 1.9).

FIG. 4 is a graph of helion to deuteron ratio in example fusion plasmas in various modes of operation. Line 44 illustrates a mode where $^3$He is produced primarily or only in the D-D reaction. Line 43 illustrates a mode where $^3$He is produced in the D-D reaction along with $^3$He decay of T from the D-D reaction. Line 42 illustrates a mode where a Li blanket is provided such that each neutron may produce one triton. Line 41 illustrates a mode where each neutron may produce 1.9 tritons.

While a relatively low plasma temperature provides for the highest fractional levels of $^3$He, it does not necessarily provide for the best suppression of the neutron energy (lowest fraction of neutron power to total fusion power, $\varepsilon_{neut}$) or the highest conversion efficiency (highest fraction of particle to total fusion power, $\varepsilon_{part}$). Insight into what is the most favorable operating condition is provided by the dependence of $\varepsilon_{neut}$ on both plasma temperature and helion to deuterium ratio. A plot reflecting these tradeoffs is found in FIG. 5.

Figure 5:
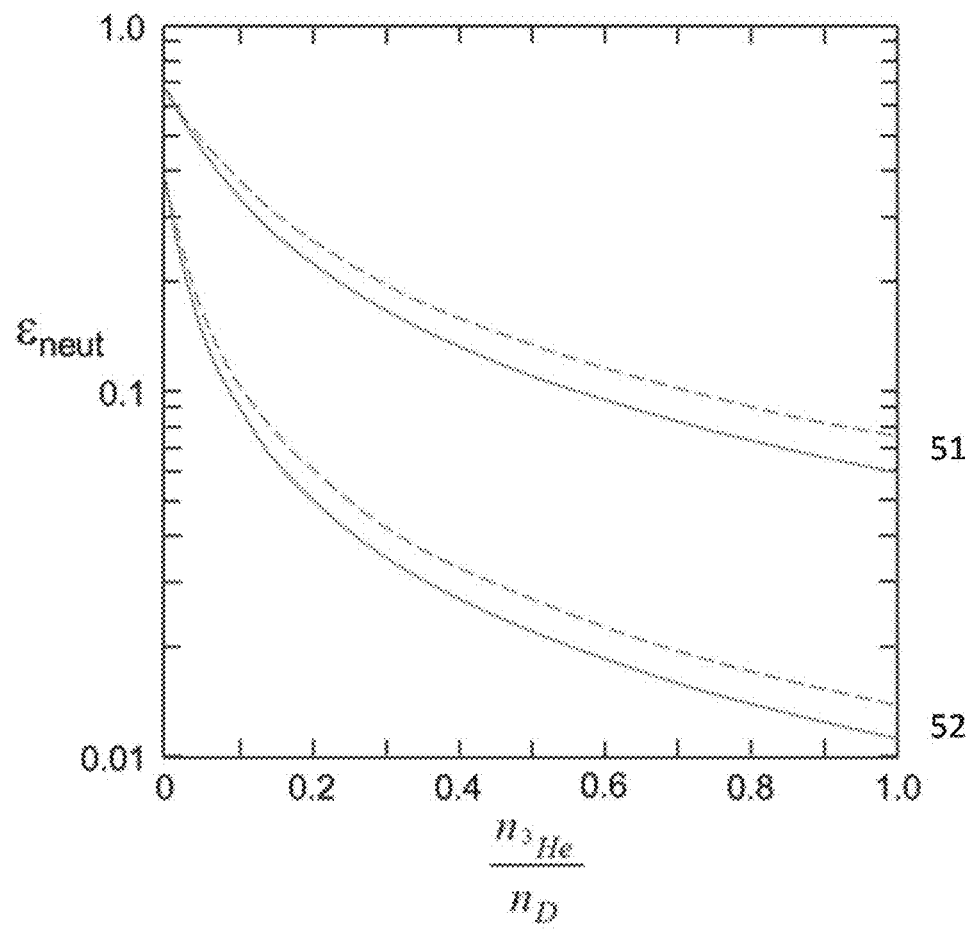
FIG. 5 is a graph of fractional neutron power as a function of helion-deuteron ratio in the fusion plasma.

FIG. 5 is a graph of fractional neutron power as a function of helion-deuteron ratio in the fusion plasma. The dashed lines indicate 50 keV plasma while the solid lines are for 70 keV. The lines 51 pertain to examples where the tritium produced in D-D reactions cannot be removed. The lines 52 reflect tritium removal after each pulse in the fusion reactor. The graph illustrates an example of the role of tritium removal in reducing neutron exposure regardless of the helion to deuteron ratio. While the sensitivity to plasma temperature is not great, the lower temperature plasmas suffer more substantial losses from Bremsstrahlung radiation. The ratio of Bremsstrahlung power loss to total fusion power produced, $\varepsilon_{brem}$ scales as $T^2$ over this range of plasma temperatures which greatly favors the higher temperatures in addition to the lower neutron power with temperature.

An example of results of optimization for an example fusion engine yield the basic plasma parameters found in the below table which provides example parameter values in each of three modes of operation—(1) D-D without tritium removal; (2) D-D with tritium removal; and (3) D-D with tritium removal and lithium blanket.

| Parameter | Cat D-D | Cat D-D (T removal) | Cat D-D (T removal w Li blanket) |
|---|---|---|---|
| $^3$He/D | 0.125 | 0.158 | 0.245 |
| $n_T/n_D$ | 0.006 | ~$10^{-3}$ | ~$10^{-3}$ |
| $n_D$ ($10^{22}$ m$^{-3}$) | 0.75 | 0.75 | 0.62 |
| $n_{tot}$ ($10^{22}$ m$^{-3}$) | 1.95 | 1.88 | 1.72 |
| $T_I = T_e$ (keV) | 70 | 70 | 70 |
| B (T) | 22 | 22 | 22 |
| τ (s) | 0.157 | 0.103 | 0.088 |
| $\varepsilon_{brem}$ | 0.25 | 0.23 | 0.22 |
| $\varepsilon_{naut}$ | 0.27 | 0.06 | 0.04 |
| $P_{fus}$ (MW) (@ 1 Hz) | 72 | 72 | 72 |

Reviewing the table, operation with tritium removal may be considerably more preferable than operation without tritium removal. The wall loading alone would restrict operation to less than 25 MW in this example as a reduction in pulse rate may be required to limit excessive wall loading. The fusion reactor could be operated with or without $^3$He generation with the D-D neutrons. The decision between these two modes will most likely reflect the cost of the additional technology, although it would appear to be a fairly straight forward use of bulk lithium in a simple, removable blanket. As the advantage is not large, the extra $^3$He could be used for startup of new fusion reactors if needed. Either way example tritium-suppressed, self-supplied fusion reactors employing D-$^3$He fuel cycles described herein may make for a sweeping advance toward a carbon-free, safe and efficient method for electricity generation from fusion.

From the foregoing it will be appreciated that, although specific embodiments of the invention have been described herein for purposes of illustration, various modifications may be made without deviating from the spirit and scope of the invention.

What is claimed is:

1. A method comprising:
supplying deuterium and $^3$He to a fusion reactor;
conducting fusion reactions including deuterium-$^3$He (D-$^3$He) fusion reactions and deuterium-deuterium (D-D) fusion reactions to produce reaction products comprising $^3$He and tritium byproducts;
pulsing the fusion reactor; and
removing, responsive to the pulsing of the fusion reactor, at least some of the tritium byproducts from the fusion reactor,
wherein the at least some of the tritium byproducts from the D-D fusion reactions are removed prior to a deuterium-tritium (D-T) fusion reaction, and
wherein the at least some of the tritium byproducts that are removed prior to contributing to a D-T fusion reaction are produced by the fusion reactor during the D-D fusion reactions.

2. The method of claim 1, wherein the tritium is removed from the fusion reactor to decay and create $^3$He.

3. The method of claim 1, wherein the tritium removed from the reactor is allowed to decay into $^3$He, which is subsequently supplied to the fusion reactor together with additional deuterium.

4. The method of claim 3, wherein the $^3$He is used by supplying the $^3$He to the fusion reactor together with additional deuterium.

5. The method of claim 3, wherein the $^3$He supplied to the fusion reactor comprises $^3$He from previous D-D fusion reactions to allow for a self-sustaining D-$^3$He fuel cycle with no external $^3$He addition.

6. The method of claim 1, further comprising storing the tritium byproducts in a location remote from the fusion reactor.

7. The method of claim 1, wherein conducting the D-D fusion reactions comprises forming at least two plasmoids and accelerating the at least two plasmoids towards one another.

8. The method of claim 1, further comprising providing a lithium blanket for production of additional $^3$He.

9. The method of claim 1, wherein the tritium byproducts are removed between pulses of the fusion reactor.

10. The method of claim 1, further comprising suppressing the D-D reaction based on a temperature at which the fusion reactions are performed and suppressing the D-T reaction by removing the at least some of the tritium byproducts.

11. The method of claim 1, further comprising performing the fusion reactions at a temperature where a fusion reactivity for D-$^3$He is greater than a fusion reactivity for D-D.

12. The method of claim 1, further comprising removing, responsive to the pulsing of the fusion reactor, at least some of the $^3$He byproducts.

13. The method of claim 12, further comprising supplying the removed $^3$He as fuel for subsequent fusion reactions.

\* \* \* \* \*